(12) United States Patent
White

(10) Patent No.: US 7,237,713 B2
(45) Date of Patent: Jul. 3, 2007

(54) SYSTEM AND METHOD OF MANAGING TIME-SENSITIVE ITEMS

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 390 days.

(21) Appl. No.: 10/843,084

(22) Filed: May 11, 2004

(65) Prior Publication Data

US 2004/0210494 A1    Oct. 21, 2004

Related U.S. Application Data

(62) Division of application No. 09/826,197, filed on Apr. 4, 2001, now abandoned.

(51) Int. Cl.
*G06K 15/00* (2006.01)
(52) U.S. Cl. .................. 235/378; 235/383; 235/385; 340/5.91
(58) Field of Classification Search ............. 235/378, 235/383, 385; 340/5.91, 572.1, 572.2; 705/22, 705/28, 20
See application file for complete search history.

(56) References Cited

U.S. PATENT DOCUMENTS

| | | | |
|---|---|---|---|
| 4,816,824 A | 3/1989 | Katz et al. | |
| 5,151,684 A | 9/1992 | Johnsen | |
| 5,239,167 A | 8/1993 | Kipp | |
| 6,019,394 A | 2/2000 | Chenoweth et al. | |
| 6,269,342 B1 * | 7/2001 | Brick et al. | 705/20 |
| 6,294,997 B1 * | 9/2001 | Paratore et al. | 340/572.1 |
| 6,327,576 B1 * | 12/2001 | Ogasawara | 705/22 |
| 6,477,503 B1 | 11/2002 | Mankes | |
| 6,552,663 B2 * | 4/2003 | Swartzel et al. | 340/572.1 |
| 6,557,760 B2 * | 5/2003 | Goodwin, III | 235/383 |
| 6,584,449 B1 * | 6/2003 | Otto | 705/20 |
| 6,659,344 B2 * | 12/2003 | Otto et al. | 235/381 |
| 6,715,676 B1 * | 4/2004 | Janning | 235/383 |
| 6,732,923 B2 * | 5/2004 | Otto | 235/383 |
| 6,873,969 B2 * | 3/2005 | Stone et al. | 705/26 |
| 6,961,709 B2 * | 11/2005 | Goodwin, III | 705/22 |
| 2002/0099631 A1 | 7/2002 | Vanker et al. | |
| 2002/0120555 A1 | 8/2002 | Lerner | |

* cited by examiner

*Primary Examiner*—Andrew Joseph Rudy
(74) *Attorney, Agent, or Firm*—Maginot, Moore & Beck; Paul Martin

(57) ABSTRACT

A method of managing time-sensitive items which relies on identification information of RFID labels associated with the items. The method includes the steps of identifying the time-sensitive item, and obtaining the expiration information from a web site of a seller of the time-sensitive item. In another form concerned with products, the method includes the steps of identifying an EPL associated with the product, causing the EPL to interrogate an RFID label on the product, receiving identification information from the RFID label, and obtaining the expiration information about the product using the identification information from the RFID label. The method additionally compares the expiration information with current date information and either causes the EPL to display a lower price or assists with removal of expired instances of a product through a report.

18 Claims, 4 Drawing Sheets

SYSTEM AND METHOD OF MANAGING TIME-SENSITIVE ITEMS

This application is a divisional of Ser. No. 09/826,197 filed Apr. 4, 2001, now abandoned.

BACKGROUND OF THE INVENTION

The present invention relates to electronic price label (EPL) systems, and more specifically to a system and method of managing time-sensitive items. EPL systems typically include a plurality of EPLs for merchandise items in a transaction establishment. EPLs typically display the price of corresponding merchandise items on store shelves and are typically attached to a rail or shelf channel along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file.

RFID technology provides an alternative to bar code reader technology for distinguishing and recording items for purchase. Some of the uses of RFID technology are disclosed in U.S. Pat. No. 6,019,394 assigned to the assignee of the present invention. This patent is hereby incorporated by reference.

Products such as produce items, bakery items, and dairy products have short shelf lives. Non-food items, such as newspapers, magazines, and flowers also have short time spans for selling. Once the expiration date approaches, retailers may mark down items for quick sale or let the items expire and dispose of them. Remarking and disposing of products is labor-intensive.

Therefore, it would be desirable to combine the communication capabilities of electronic price label systems with RFID technology in order to lower prices and identify expired products.

SUMMARY OF THE INVENTION

In accordance with the teachings of the present invention, a system and method of managing time-sensitive items is provided.

In one embodiment, the includes a first computer which has a web site address and which stores the information about the time-sensitive item, and a second computer which identifies the time-sensitive item and which contacts the first computer to obtain the information.

In another embodiment, the system includes an RFID label affixed to the product, and a computer which identifies an EPL associated with the product, causes the EPL to interrogate the RFID label, receives identification information from the RFID label, and obtains the information about the product using the identification information from the RFID label.

In another embodiment, the system includes an RFID label affixed to the product, a first computer associated with a supplier of the product which has a web site address and which stores the expiration information about the product, and a second computer which identifies an EPL associated with the product, causes the EPL to interrogate the RFID label, receives identification information from the RFID label, sends the identification information from the RFID label to the first computer, and receives the expiration information about the product from the first computer. The second computer may generate a report identifying the product as being expired if current date information is after the expiration information, or cause the EPL to display a lower price if the current date information is within a predetermine time before the expiration information.

The method includes the steps of identifying the time-sensitive item, and obtaining the expiration information from a web site of a seller of the time-sensitive item. In another form concerned with products, the method includes the steps of identifying an EPL associated with the product, causing the EPL to interrogate an RFID label on the product, receiving identification information from the RFID label, and obtaining the expiration information about the product using the identification information from the RFID label. The method additionally compares the expiration information with current date information and either causes the EPL to display a lower price or assists with removal of expired instances of a product through a report.

It is accordingly an object of the present invention to provide a system and method of managing time-sensitive items.

It is another object of the present invention to use expiration date information stored in a product RFID label to automatically lower prices before the expiration date.

It is another object of the present invention to use expiration date information stored in a product RFID label to generate a report identifying expired products.

It is another object of the present invention to obtain information about an item, such as expiration information, from a web site of a supplier or manufacturer using identification information associated with an RFID label affixed to the item.

It is another object of the present invention to obtain RFID label information through an electronic price label system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
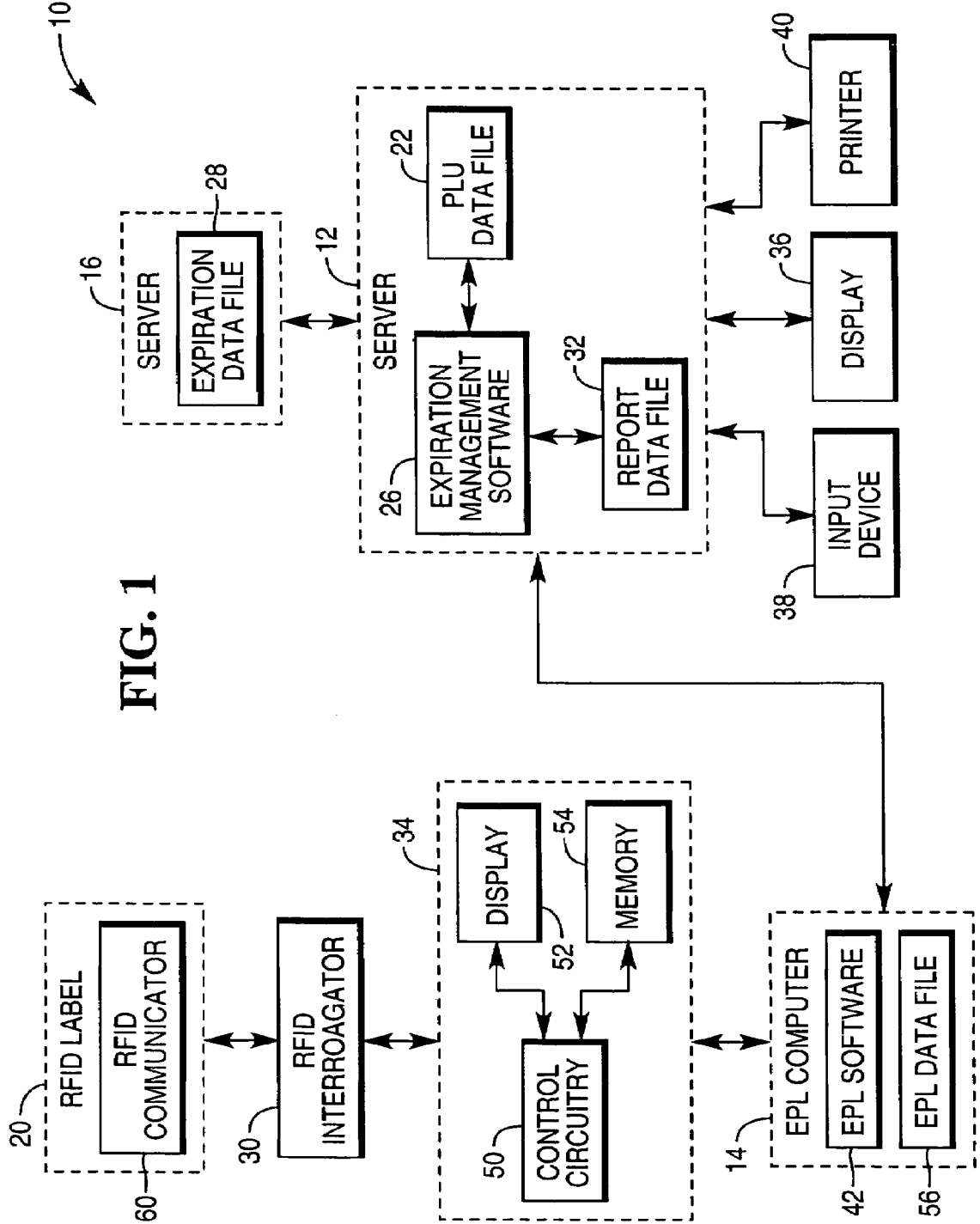
FIG. 1 is a block diagram of a transaction processing system.

Referring now to FIG. 1, transaction system 10 primarily includes server 12 and EPL computer 14, and radio frequency identification (RFID) label 20.

Server 12 handles price requests from transaction terminals and maintains price information in PLU data file 22.

Server 12 also executes expiration management software 26 which tracks product expiration information. Expiration information is stored within expiration data file 28, either locally at server 12 or at another server, such as a World Wide Web (Web) server 16 of the seller, who may be a supplier or manufacturer, and who determines the expiration information for its products.

Expiration management software 26 uses the identification information from RFID labels 20 to determine dates of expiration for corresponding items from expiration data file 28. Expiration management software 26 instructs EPL software 42 to send a message to an EPL 34 associated with an aging item with instructions to display a lower price.

Expiration management software 26 maintains report data file 32, which contains a list of aging items and corresponding their RFID label identification information. Report data file 32 may additionally include EPLs 34 associated with aging products. Expiration management software 26 provides reports which may be displayed by display 36 or printed by printer 40. A store employee may manage reporting and data entry through input device 38, which may include a keyboard.

To assist with execution of certain tasks performed by expiration management software 26, server 12 includes a built-in time keeping device, commonly referred to as a system clock, which is synchronized with current time, in order to automatically execute the tasks at their scheduled times.

The present invention also envisions that the functions of server 12 may be handled by EPL computer 14, or vise versa, effectively combining both of their functions into a single computer.

EPL computer 14 executes EPL software 42. EPL software 42 is responsible for scheduling and transmitting messages to EPLs 34, including messages containing price data. EPL software 42 obtains prices from PLU data file 22.

EPL software 42 periodically sends messages to EPLs 34 associated with perishable items requesting identification information from RFID labels 20. EPL software 42 activates RFID interrogators 30 and forwards received identification information from RFID labels 20 to expiration management software 26.

Communication between EPL computer 14 and EPLs 34 may be wireless or wired communication.

EPL 34 includes control circuitry 50, display 52, and memory 54. Control circuitry 50 controls operation of EPL 34. Control circuitry 50 receives incoming messages from EPL computer 14 and acknowledges messages from EPL computer 14. Control circuitry 50 receives RFID identification information from RFID interrogators 30 and stores the identification information in memory 54 until it can be sent to EPL computer 14. Control circuitry 50 also displays a lower price on display 52 in response to a message from EPL software 42.

EPL software 42 maintains EPL data file 56 which includes EPL identification information and price verification information.

RFID interrogator 30 receives identification information from nearby items bearing RFID labels 20. Communicates the identification information to EPL software 42 through EPL 34. RFID interrogator 30 may be mounted to shelves or integrated into shelves.

RFID label 20 includes RFID communicator 60, which sends identification information to RFID interrogators 30. RFID communicator 60 may be a passive device, which uses energy from RF, capacitive, or inductive energy fields. RFID communicator 60 may receive power from RF energy transmitted by RFID interrogator 30. RFID communicator 60 sends a unique identifier to RFID interrogator 30.

Figure 2:
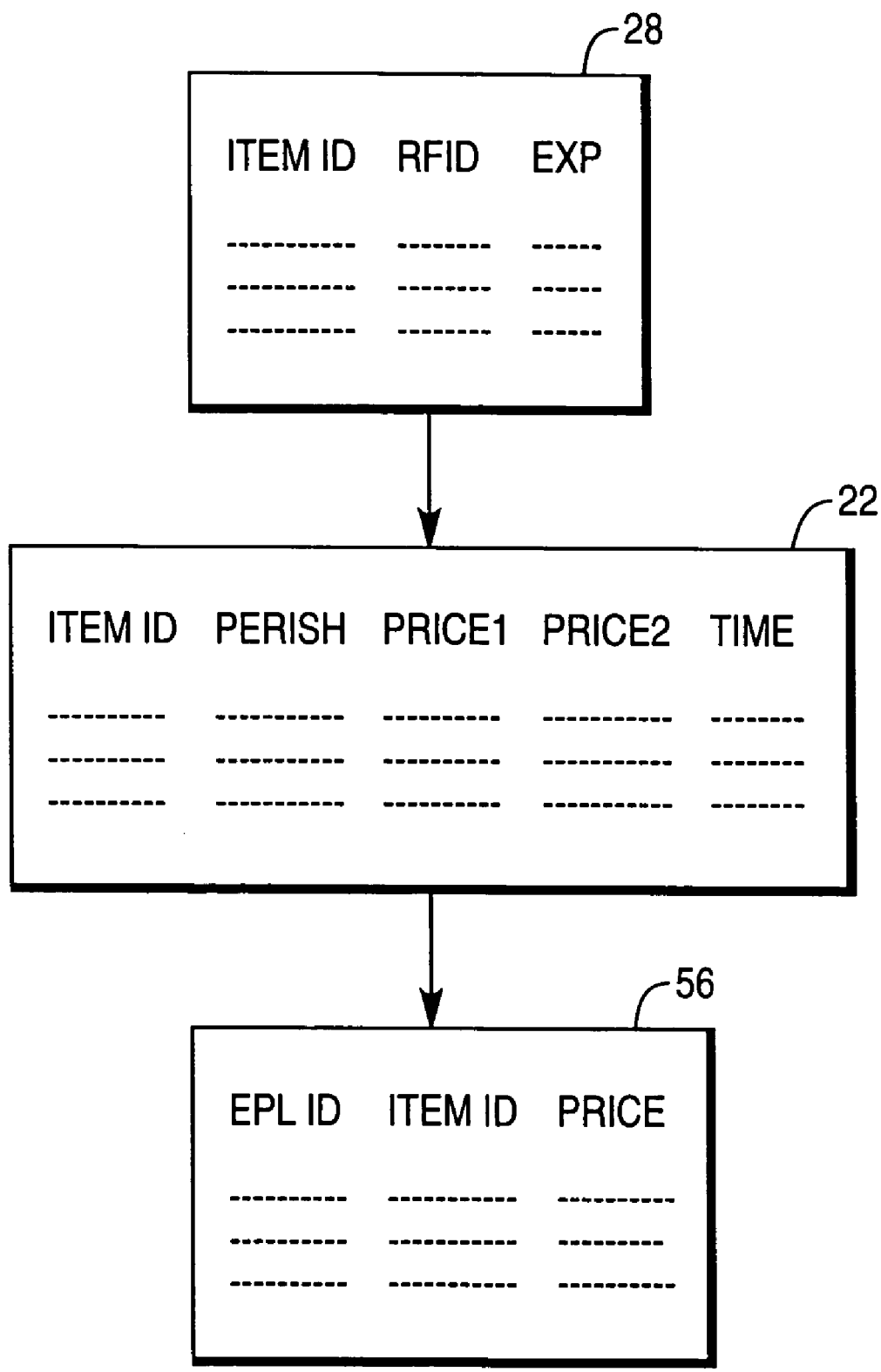
FIG. 2 is representative diagram of data files used by the transaction processing system.

Turning now to FIG. 2, PLU data file 22, EPL data file 56 and expiration data file 28 are shown in more detail.

PLU data file 22 includes entries ITEM ID, PRICE1, PRICE2, TIME, and PERISH.

Entry ITEM ID represents information identifying an item.

Entries PRICE1 and PRICE2 identify prices which may be charged for the item. PRICE1 is a normal price and PRICE2 is a discount price.

Entries TIME identifies a time difference from expiration for charging PRICE2.

Entry PERISH represents a date flag which is set to either on or off. If the flag is on, then the item is a perishable item with an expiration date. Otherwise, the item is not a perishable item.

EPL data file 56 includes entries EPL ID, ITEM ID, and PRICE.

Entry EPL ID represents information identifying EPLs 34. Each EPL 34 has a unique identification.

Entry ITEM ID represents information identifying an item which is associated with a particular EPL 34 and is located adjacent EPL 34.

Entry PRICE represents price information for the item associated with EPL 34. Price information is derived from PLU data file 22 and may include price verification information.

Expiration data file 28 is maintained by a seller who determines expiration dates for products and who affixes RFID labels 20 to the products. Expiration data file 28 includes entries ITEM ID, RFID, and EXP.

Entry ITEM ID represents information identifying an item which is associated with a particular RFID label 20.

Entry RFID represents information identifying each RFID label 20.

Entry EXP represents expiration date information for each RFID label 20.

Figure 3A:
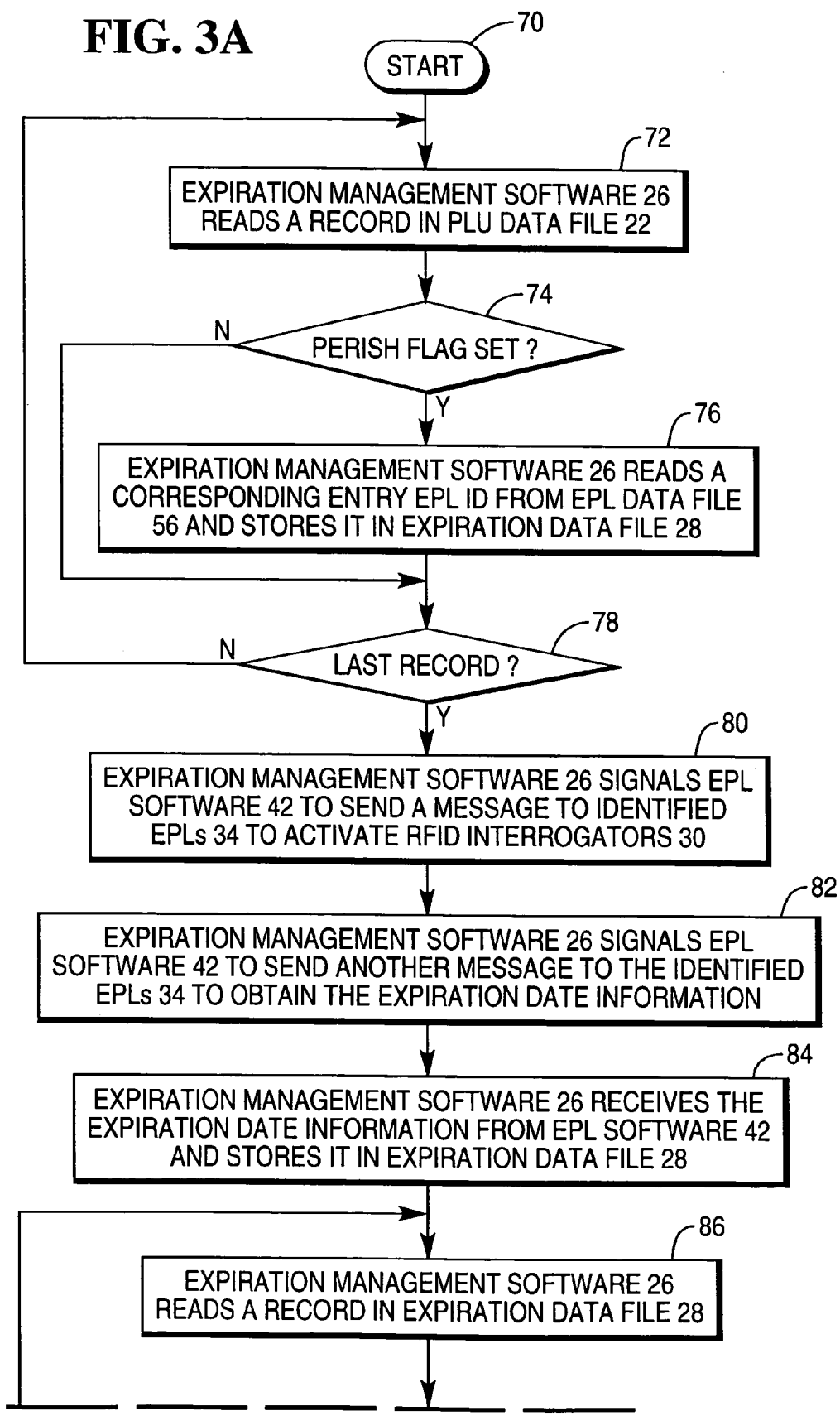
FIG. 3 is a flow diagram illustrating the method of the present invention.
Figure 3B:
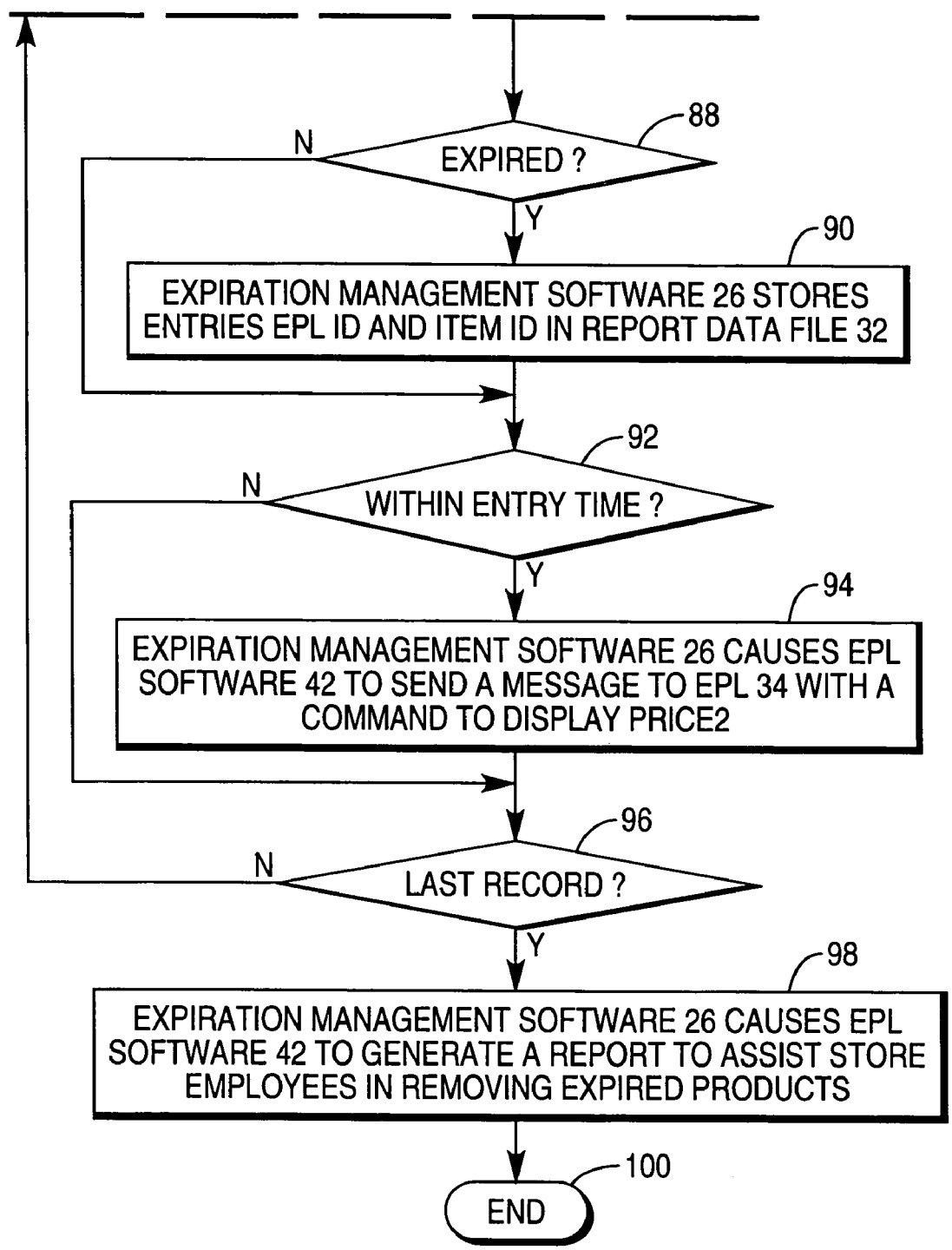

Turning now to FIG. 3, the method is illustrated in more detail beginning with START 70.

In step 72, expiration management software 26 reads a record in PLU data file 22.

In step 74, expiration management software 26 determines whether the PERISH flag is set for the ITEM ID. If so, operation proceeds to step 76. Otherwise, operation proceeds to step 92.

In step 76, expiration management software 26 reads a corresponding entry EPL ID from EPL data file 56.

In step 78, expiration management software 26 signals EPL software 42 to send a message to the identified EPL 34 to activate RFID interrogator 30.

In response to the message, EPL 34 activates RFID interrogator 30. RFID interrogator 30 receives identification information from RFID labels 20 on the instances of the product identified by ITEM ID. Each instance has a unique RFID label 20 in order to separate newer products from older products.

In step 80, expiration management software 26 receives the identification information from EPL software 36.

In step 82, expiration management software 26 obtains expiration information associated with the identification information from expiration data file 28.

In step 84, expiration management software 26 compares expiration dates with a current date to see if any of the expiration dates are before the current date. If so, operation proceeds to step 86. Otherwise, operation proceeds to step 88.

In step 86, expiration management software 26 stores entries EPL ID, ITEM ID, and/or RFID of expired items in report data file 32. Operation proceeds to step 88.

In step 88, expiration management software 26 compares the difference between the current date and the expiration dates with entry TIME to determine whether an associated EPL 34 should display a lower price. If so, operation proceeds to step 90. Otherwise, operation proceeds to step 92.

In step 90, expiration management software 26 causes EPL software 42 to schedule a message commanding EPL 34 to display the lower price. The lower price PRICE2 may be contained with the message or previously stored within memory 54 of EPL 34 and activated by the message.

In step 92, expiration management software 26 determines whether the ITEM ID record in PLU data file 22 is the last record. If not, operation returns to step 72 to read another record. Otherwise, operation proceeds to step 94.

In step 94, expiration management software 26 generates a report to assist store employees in removing expired products. The report may be printed by printer 40 or displayed by display 36. Store employees view the expired sign on affected EPLs 34 and visually check expiration dates to determine the expired products. Operation ends in step 96.

Operation of expiration management software 26 may be scheduled or conducted manually.

Although the present invention has been described with particular reference to certain preferred embodiments thereof, variations and modifications of the present invention can be effected within the spirit and scope of the following claims.

I claim:

1. A method of pricing a product comprising the steps of:
   identifying an electronic price label associated with the product;
   causing the electronic price label to interrogate a radio frequency identification label on the product;
   receiving identification information from the radio frequency identification label;
   obtaining expiration information of the product stored in a memory remote from the radio frequency identification label using the identification information from the radio frequency identification label;
   comparing the expiration information to a first current date information; and
   determining a first price for the product based upon the comparison.

2. The method of claim 1, wherein obtaining the expiration information comprises accessing the expiration information through a server.

3. The method of claim 1, further comprising:
   comparing the expiration information to information associated with a second current date information; and
   changing the price of the product from the first price to a second price based upon the comparison of the expiration information to information associated with the second current date information.

4. The method of claim 3, further comprising:
   displaying the second price with the electronic price label.

5. The method of claim 3, further comprising: obtaining the second price through an internet server.

6. A method of pricing a plurality of products comprising the steps of:
   identifying an electronic price label associated with a plurality of products;
   causing the electronic price label to interrogate radio frequency identification labels on the plurality of products;
   receiving identification information from the radio frequency identification labels;
   obtaining expiration information of the plurality of products using the identification information from the radio frequency identification labels;
   comparing the expiration information with a first current date information; and
   causing the electronic price label to display a first price for the plurality of products based upon the comparison.

7. The method as recited in claim 6, wherein the step of obtaining comprises the sub step of:
   obtaining the expiration information for the plurality of products from a web site of a seller of the plurality of products.

8. The method of claim 6, wherein obtaining the expiration information comprises accessing the expiration information through a server.

9. The method of claim 6, further comprising:
   comparing the expiration information to information associated with a second current date information; and
   changing the price of the plurality of products from the first price to a second price based upon the comparison of the expiration information to information associated with the second current date information.

10. The method of claim 9, further comprising:
    displaying the second price with the electronic price label.

11. The method of claim 9, further comprising:
    obtaining the second price through an internet server.

12. The method of claim 9, further comprising:
    comparing the expiration information to information associated with the current date; and
    identifying the product as expired based upon the comparison.

13. A method of pricing products based upon expiration information comprising:
    storing expiration data for each of a plurality of products in a memory;
    associating one of a plurality of radio frequency identification labels with each one of the plurality of products;
    storing product identification information in each of the plurality of radio frequency identification labels;
    interrogating each of the plurality of radio frequency identification labels to obtain, with an electronic price label for a display area, the stored product identification information for the associated product;
    using the obtained product identification information to obtain the stored expiration data;
    comparing the obtained expiration data for a first of the plurality of products with a first current date information; and
    determining a first price for the first of the plurality of products based upon the comparison.

14. The method of claim 13, further comprising:
    comparing the obtained expiration data for the first of the plurality of products with a second current date information; and
    determining a second price for the first of the plurality of products based upon the comparison, wherein the second price is less than the first price.

15. The method of claim 13, wherein interrogating comprises interrogating, with the electronic price label, each of the plurality of radio frequency identification labels to obtain the stored product identification information for the associated product.

16. The method of claim 13, wherein storing product identification information comprises storing product identification information in each of the plurality of radio frequency identification labels that uniquely identifies the associated one of the plurality of products.

17. The method of claim 16, further comprising:
    comparing the obtained expiration data for a second of the plurality of products with the first current date information; and determining a third price for the second of the plurality of products based upon the comparison, wherein the third price is different from the first price.

18. The method of claim 13, wherein using the obtained product identification information to obtain the stored expiration data comprises using the obtained product identification information to obtain the stored expiration data through an internet server.

* * * * *